Inventor:
K. Sandgänger

Nov. 25, 1958
K. SANDGÄNGER
2,861,673
CONVEYOR WITH COACTING CONVEYOR BELT
Filed Feb. 1, 1954
4 Sheets-Sheet 2
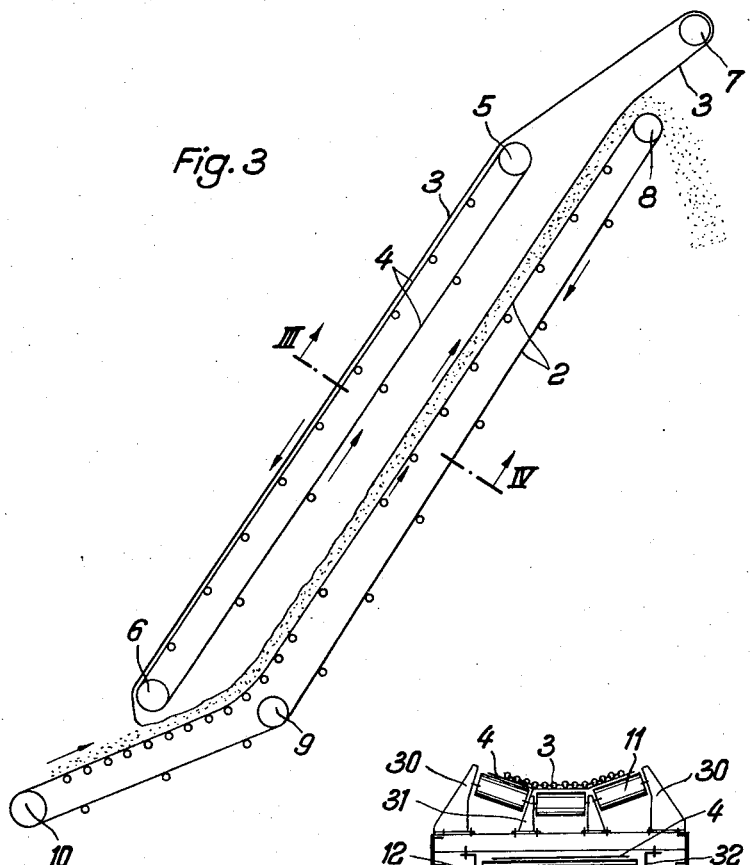
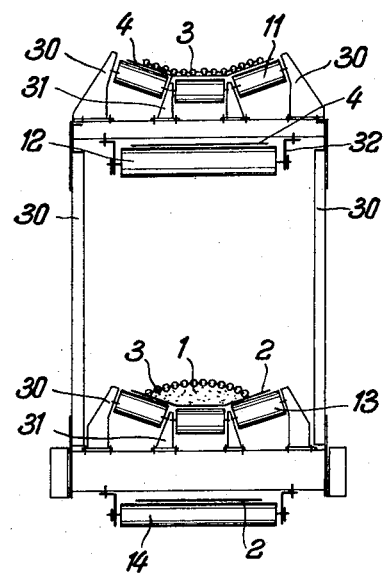
Inventor:
K. Sandgänger Nov. 25, 1958 K. SANDGÄNGER 2,861,673
CONVEYOR WITH COACTING CONVEYOR BELT
Filed Feb. 1, 1954 4 Sheets-Sheet 3

Inventor:
K. Sandgänger

Nov. 25, 1958 K. SANDGÄNGER 2,861,673
CONVEYOR WITH COACTING CONVEYOR BELT
Filed Feb. 1, 1954 4 Sheets-Sheet 4

Inventor:
K. Sandgänger

United States Patent Office 2,861,673
Patented Nov. 25, 1958

2,861,673

CONVEYOR WITH COACTING CONVEYOR BELT

Karl Sandgänger, Dortmund, Germany

Application February 1, 1954, Serial No. 407,437

Claims priority, application Germany February 14, 1953

10 Claims. (Cl. 198—165)

The invention relates to the construction of a conveyor which serves for conveying earth, waste, brown coal, coal and similar materials which are of a granular or lumpy nature. Conveyors wherein transporting is carried out by means of a conveyor belt have the disadvantage that they can only work on a limited upward gradient. With gradients of more than approximately 20° the conveyed material begins to slip owing to its nature, so that conveying is not possible at steeper gradients.

The object of the present invention is to develop a conveyor capable of operating on a substantially steeper gradient. The invention is based on the knowledge that in order to achieve this aim relatively great frictional forces have to be produced artificially between the belt and the conveyed material and between the granular constituents of the conveyed material itself.

According to the invention, a second belt is additionally arranged above a conveyor belt of normal construction the said second belt having a very considerable dead weight owing to its special construction. This second belt, which may also be termed a mat, rotates in the region of the conveying path above and along with the conveyor belt, and bears elastically on the surface of the conveyed material, so that the latter is given an artificially increased applied load throughout the whole length of the conveying path and over the entire width thereof. The additional belt consists of a plurality of chain links or wire rope elements manufactured from steel or any other metal of great weight. A further essential feature of the invention consists in that the individual links or elements are pivotally connected to one another. This pivotal connection of the links enables the mat or second belt to bear flush against the irregular surface of the conveyed material. The invention further relates to an additionally arranged belt whose elements are interconnected in the form of a net, so that the belt is adapted to be shortened and extended alternately in the transverse and in the longitudinal direction.

The invention finally relates to a particular arrangement of the guide rollers for the second belt or mat. These rollers are so arranged that the mat hangs down freely at the point at which the material to be conveyed is loaded on to the conveyor, but is so guided in the region of the delivery point that the dead weight of the mat can still act on the conveyed material throughout the entire region of the delivery point and that moreover the stresses exerted on the guide rollers by the belt are distributed in an advantageous manner. With a conveyor according to the invention, it is possible to convey on gradients of up to 65°.

Several constructional examples of the invention will now be described with reference to the accompanying drawings.

Figure 3 is a side elevation of a second constructional example of the invention.

Figure 4 is a sectional view taken along the line III—IV of Figure 3.

Figure 1:
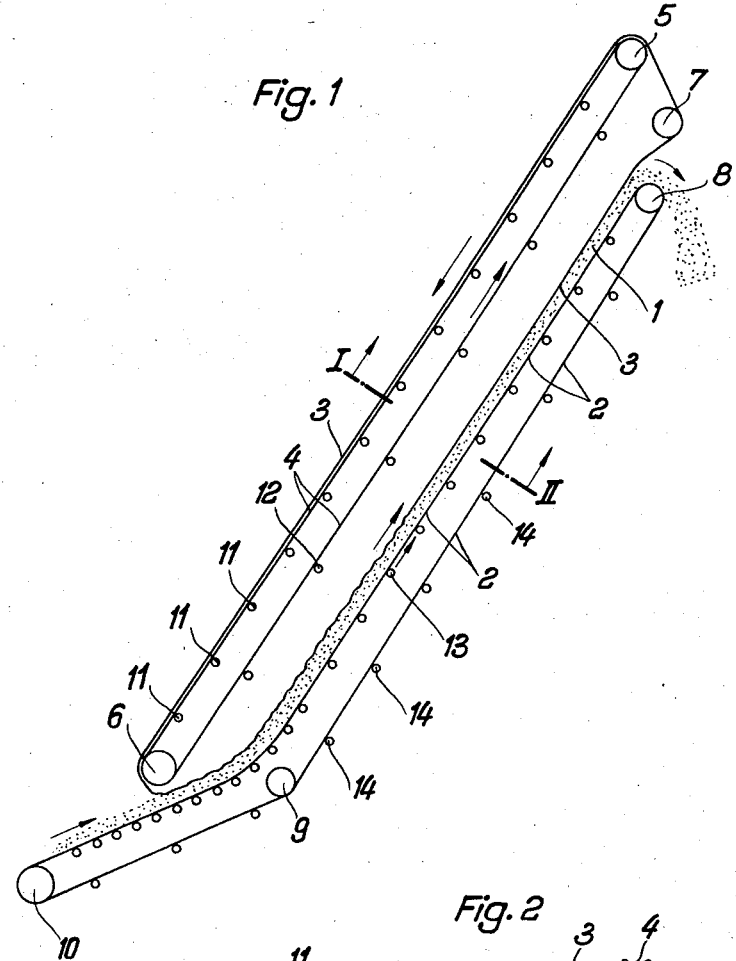
Figure 1 is a diagrammatic side view of a conveyor installation according to the invention.
Figure 2:
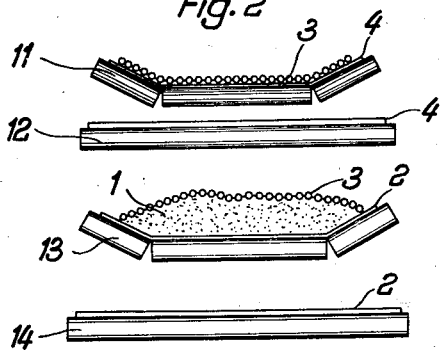
Figure 2 is a sectional view of the conveyor installation shown in Figure 1, taken along the line I—II of Figure 1.

In the constructional example according to Figures 1 and 2 the material 1 to be conveyed is carried by a conveyor belt 2, which in this constructional example is constructed as an endless traveling belt. Disposed above this conveyor belt 2 is a second belt or mat 3, which is likewise constructed as an endless belt. In the region of the path of conveyance, this second belt 3 bears on the surface of the conveyed material 1. In the illustrated constructional example, the belt 3 is driven by a further belt 4, which is also constructed as an endless belt.

The conveyor belt 4 is driven and guided by drums or rollers 5 and 6, one or more of which may be provided with a drive. The belt 3 also travels over the drums 5 and 6 and is carried along between these drums by the belt 4. The belt 3 hangs down freely below the belt 4 and is guided only by the drum 7. This guide drum 7 is downwardly offset relatively to the line of travel followed by the belt 3 when conveying material. This enables the belt or mat 3 also to act on the conveyed material over the whole region of the delivery point. Drums or rollers 8, 9 and 10 serve to guide the conveyor belt 2. In this case also, the drive may be provided at one or more of the rollers.

The driving belt 4 is supported in its upper run by rollers 11 and in its lower run by rollers 12. The conveyor belt 2 is supported by rollers 13 and 14. As may be seen from Figure 2, the rollers 11 and 13 may be inclined in the transverse direction so as to form a trough open at the top. The support frames on which or in which the driving or guide drums are mounted have been omitted from Figures 1 and 2 in order that the latter may be more readily understood.

The constructional example according to Figures 3 and 4 differs substantially from the constructional example according to Figures 1 and 2 in that the guide drum 7 is arranged in a different manner, this drum being set forward to a relatively considerable extent with respect to the guide drum 8, while the guide drum 5 is disposed in a somewhat lower position. The position of the drum 7 relative to the position of the drum 5 makes it possible for the drum 7 to take up the greater part of the tractive forces arising out of the dead weight of the belt 3. The sectional view according to Figure 4 shows by way of example the arrangement of a support frame 30 which does not however, form part of the invention and is merely intended to support the drums and rollers. The guide rollers 11, 12, 13, 14 rotate on spindles which are mounted in bearings 30, 31 and 32. The bearing brackets are fixed to the support frame 30 by riveting and welding. The same arrangement may be provided in the case of the constructional example shown in Figures 1 and 2.

Figure 5:
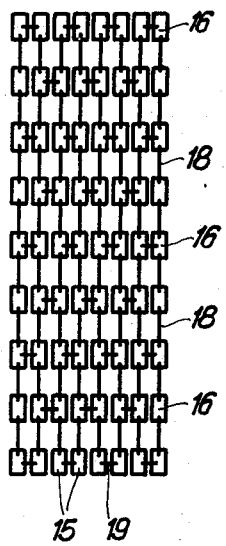
Figures 5 and 6 are a plan view and side view respectively of details of a mat according to the invention.
Figure 6:
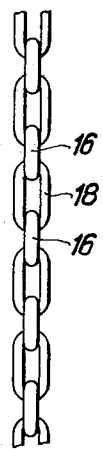
Figure 7:
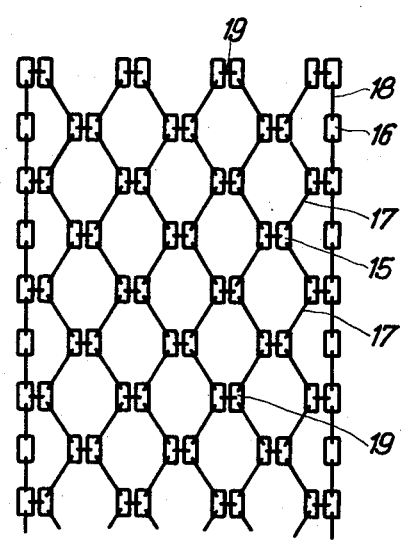
Figure 7 is a plan view of the mat according to Figures 5 and 6, but with the mat stretched in the transverse direction.

According to the invention the mat 3 shown in Figures 1 to 4 consists of a plurality of lengths of chain, wire rope or links, the elements of which are pivotally connected together. Figures 5 to 7 now show a further constructional example of a mat 3 which is extensible in the transverse direction owing to the net-like and pivotal connection of its elements. As already stated, such a mat must have a considerable dead weight and must be capable of bearing with its entire surface on the conveyed material. Such a method of operation is obtained with the mat 3 shown in Figures 2 and 4. The operation of the mat is however, improved if it is to constructed as to be extensible in the transverse direction and at the same time shortenable in the longitudinal direction, or vice versa. A construction of this type is obtained if the individual weight elements 15, 16 of the mat 3 are so interconnected by articulated connecting bars, rings or eyes 17, 18 as to form a net (see Figure 7). In the constructional example shown the inner weight elements are designated by 15 and the outer weight elements by 16. The outer elements 16 are pivotally connected in the longitudinal direction of the mat by connecting bars, rings or eyes 18. Each second element 16 is here so connected to the inner elements 15 that in the transversely stretched condition of the mat the connecting bars 17 form diagonal patterns. Each second weight element 16 and all the inner weight elements 15 are arranged in pairs, each pair being pivotally connected by an eye 19 in the transverse direction of the mat. The constructional example shown in Figures 5 to 7 is intended more particularly for conveying coarse material.

Figure 8:
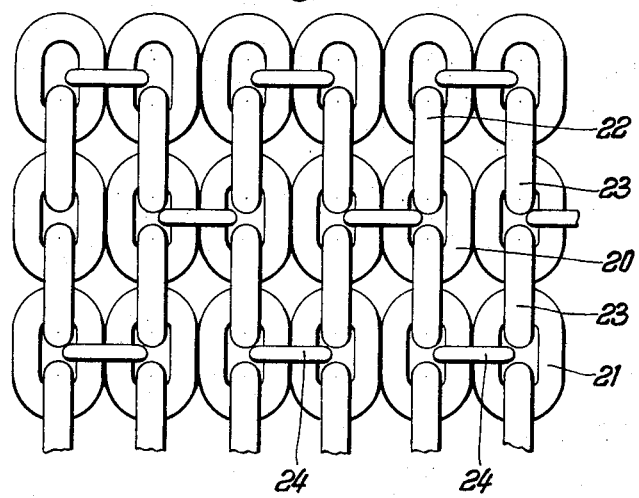
Figures 8 and 9 are a plan view and side view respectively of a further constructional example of a mat.
Figure 9:
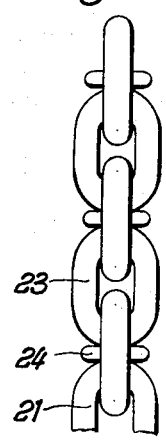
Figure 10:
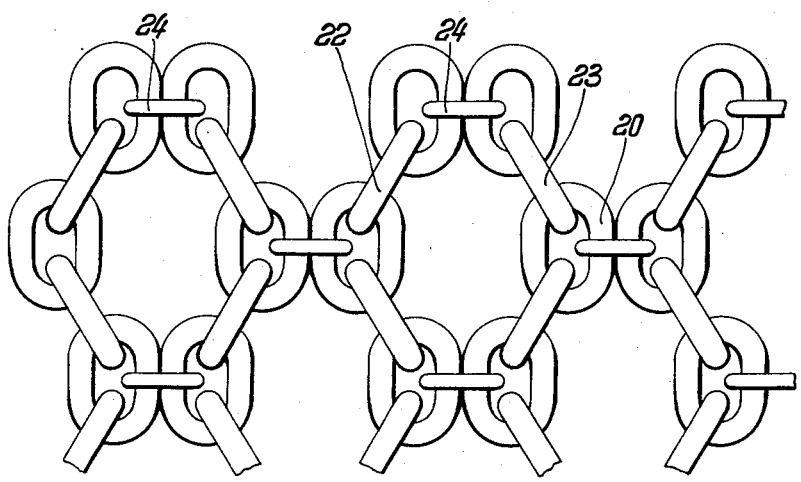
Figure 10 is a view of the mat according to Figures 8 and 9 but showing the mat stretched in the transverse direction.

However, in cases where the material to be conveyed contains a large number of fine-grained components, it is preferable to use the mat shown on a larger scale in Figures 8 to 10, in which however, the same net-like connection of the individual parts is employed as in the mat shown in Figures 5 to 7. The mat also consists of outer elements 21 and inner elements 20, which are of substantially the same construction but which differ from one another as regards their arrangement. The outer elements 21 are connected by eye-like elements 23. The latter however, are shorter than the connecting eyes 18 shown in Figures 5 to 7. The inner elements 20 are connected by eyes 22 in the same manner as in the case of the mat according to Figures 5 to 7. The pair of elements 20 are connected to one another in the transverse direction of the mat by eyes 24. Figure 10 shows the mat in the transversely extended condition. Comparison of this figure with Figure 7 shows that the gaps between the individual elements are here substantially smaller than in the mat according to Figure 7.

I claim:

1. A belt conveyor having a lower endless belt adapted to convey granular material of non-uniform grain size in an upwardly inclined direction, and an upper endless belt which in adapted to travel above and with the lower belt and comprises heavy non-extensible chain elements pivotally interconnected to form two edge chains and a plurality of inner chains, and cross-connecting members pivotally interconnecting the chains, and in which each inner chain has only every other element cross-connected to an adjacent chain by a cross-connecting member and in each inner chain the said cross-connected elements are connected alternately to an adjacent chain on one side and to an adjacent chain on the other side, and each edge chain has only every fourth element connected by a cross-connecting member to an adjacent inner chain, whereby the upper belt is extensible in width and at the same time shortenable in length and vice versa without deformation of any of its elements, and has sufficient dead weight to increase the frictional forces acting between the lower belt and the conveyed material and between the components of the conveyed material, said weight being so great that even upon a change of inclination of the conveyor belt sufficient load is applied to the conveyed material to prevent slipping.

2. A conveyor as claimed in claim 1, in which the upper belt is adapted to assume the general shape of a net when extended in width.

3. A conveyor as claimed in claim 1, in which a guide drum for the upper belt is arranged above the delivery point and is adapted to cause the weight of the upper belt to act on said material in the region of said point.

4. A conveyor as claimed in claim 3, in which the guide drum is downwardly offset relatively to the line of travel followed by the upper belt.

5. A conveyor as claimed in claim 3 in which the guide drum is set forward with respect to the upper driving roller and is adapted to take up greater part of the tractive forces arising out of the dead weight of the upper belt.

6. A conveyor as claimed in claim 1, in which the lower belt passes over a bottom roller which is vertically adjustable to adjust the angle of the lower belt at the intake point.

7. A conveyor as claimed in claim 1, in which the chain elements and cross-connecting members are chain links.

8. A conveyor as claimed in claim 1, in which the cross-connecting members are articulated connecting bars, and every second chain element in each chain is an articulated connecting bar.

9. A conveyor as claimed in claim 1, in which each cross-connecting member interconnects two chain elements each belonging to a different chain, in such a manner as to keep the two elements at a constant distance from one another.

10. A conveyor as claimed in claim 7, in which all the links are of the same length.

References Cited in the file of this patent

UNITED STATES PATENTS

| 526,166   | Stark   | Sept. 18, 1894 |
| 890,292   | Monette | June 9, 1908   |
| 1,935,770 | Elliott | Nov. 21, 1933  |
| 2,493,837 | Smith   | Jan. 10, 1950  |

FOREIGN PATENTS

| 254,242 | Italy         | July 14, 1927 |
| 441,077 | Great Britain | Jan. 13, 1936 |
| 516,960 | Germany       | Jan. 29, 1931 |